Patented June 26, 1951

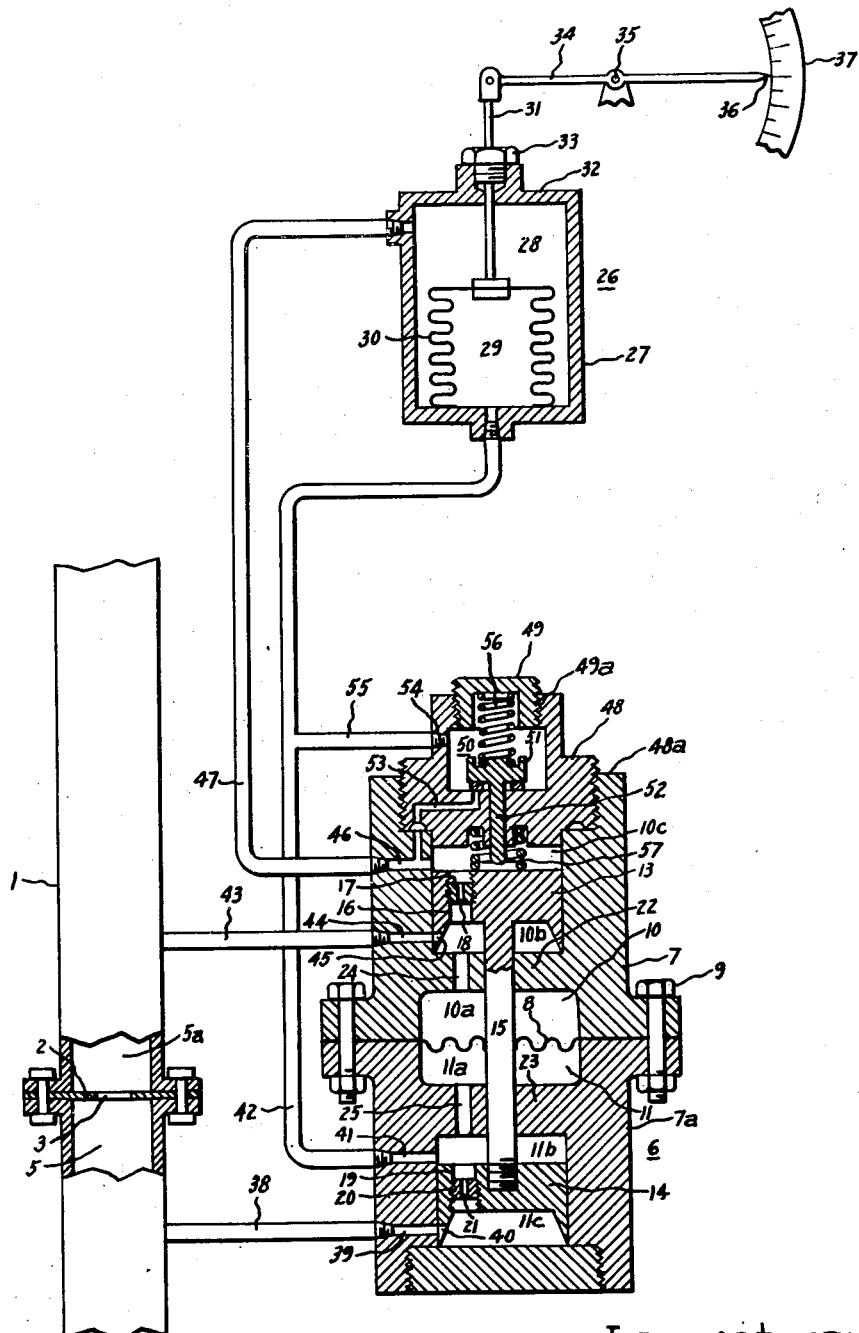

2,558,534

UNITED STATES PATENT OFFICE 2,558,534

OVER-PRESSURE PROTECTIVE DEVICE

Arthur P. Bentley, Scotia, N. Y., assignor to General Electric Company, a corporation of New York Application June 19, 1950, Serial No. 169,020

3 Claims. (Cl. 73—389)

This invention relates to an over-pressure protective device and, in particular, to a protective device for a differential gauge of the type used to measure the flow of an expansible fluid through a conduit.

By conduit is meant any conductor which is adapted to constrain a compressible fluid and direct its flow. The flow may be caused by a pressure differential produced by the resistance of a heat exchanger, an orifice in an obstruction plate, or the like. The pressure differential produced by such a resistance can be correlated with the rate of flow through the conduit; consequently, it is important to be able to measure the pressure differential.

A differential pressure gauge is a convenient apparatus for making such measurement. By differential gauge is meant an instrument responsive to difference in pressures on opposite sides of a resistance. The pressure differential is indicative of the flow across that resistance and, in addition, the pressure differential indicates the value of the resistance offered. This pressure differential can be transmitted to a meter for a direct reading of the differential pressure.

In differential gauges of the type described, frequently one of the operative elements is a delicate bellows that expands and contracts in response to the pressure differential on its opposite sides. Because of its delicate sensitivity, however, a high unbalanced pressure will rupture the material of the bellows. Such a high unbalanced pressure can be a result of the explosion that takes place within the expansible fluid or it can be caused by an obstruction that blocks the passage of fluid through the conduit.

It should be pointed out at this time that while a bellows operated differential meter has been and will be referred to, such a reference has been selected merely to illustrate more clarly the operation of this invention, and it is not intended to be a limitation of its scope, which is broad enough to operate on many types of differential meters.

It is an object of this invention to provide a device which will protect a differential meter against an excessive differential pressure.

It is a further object of this invention to provide a new and improved over-pressure protective device for a differential gauge.

It is a still further object of this invention to provide a new and improved over-pressure protective device that operates in response to compressible fluids to automatically disengage a differential gauge from a pressure source to be measured.

It is a stil further object of this invention to provide a new and improved over-pressure protective device that is simple in construction and automatic in operation.

Further objects and advantages of this invention will become apparent and the invention will be more clearly understood from the following description referring to the accompanying drawing, and the features of novelty which characterize this invention will be pointed out with particularity in the claims annexed to and forming a part of this specification.

Briefly, this invention comprises a device responsive to a predetermined pressure diffential between two points or on opposite sides of some obstruction or resistance within a conduit to activate valves that cut off the supply of compressible fluid to a differential gauge whereby the gauge is temporarily isolated from the conduit; the compressible fluid within the differential gauge is balanced to equalize the pressure acting on the differential gauge; and finally when the differential pressure in the conduit again recedes below the predetermined limit, the gauge is automatically reconnected to the conduit.

In the drawing, the single figure is a simple schematic drawing of the operating elements of this invention.

Referring to the drawing, a conduit 1 is shown having an obstruction 2 defining a central orifice or opening 3. The obstruction 2 separates the conduit into a compartment 5 which is the high pressure compartment and a compartment 5a which is the low pressure compartment. The difference in pressure between the two compartments is caused by the resistance to the flow of compressible fluid offered by orifice 3.

An over-pressure protective device 6 comprises a pair of axially juxtapositioned cylinder blocks 7 and 7a which are spaced apart by a flexible diaphragm 8 and removably interconnected by a plurality of bolts 9.

Cylinder blocks 7 and 7a each provide a cylinder 10 and 11, respectively, which, in turn, are separated by the flexible diaphragm 8.

As will be hereinafter described, cylinder 10 is further subdivided into three cylindrical compartments 10a, 10b, and 10c, while cylinder 11 is subdivided into three cylindrical compartments 11a, 11b, and 11c.

The cylindrical compartment 10b is provided with a piston 13 which is axially slidable therein, and cylindrical compartment 11b is provided with a second piston 14 which is axially slidable therein. The two pistons, in turn, are rigidly interconnected by an axial rod 15 which causes the pistons to move one with the other.

Diaphragm 8, which divides cylinder blocks 7 and 7a, is generally circular and provided with an axial opening through which rod 15 is passed. Diaphragm 8, which in a preferred embodiment is made of neoprene or other impregnated material, is secured to rod 15 substantially midway along its length, either by cement, or by a ring (not shown).

Piston 13 is provided with a threaded bore 16 and a threaded ferrule 17 that is provided with a central axial passageway 18, while piston 14 is provided with a threaded bore 19 and a threaded ferrule 20 that is provided with a central axial passageway 21. In accordance with this structure, piston 13 divides cylinder 10 into compartments 10b and 10c which are interconnected by passageway 18, while piston 14 divides cylinder 11 into compartments 11b and 11c which are interconnected by passageway 21.

In order to guide the axial movement of rod 15, a web 22 is provided in cylinder block 7 and a web 23 is provided in lower cylinder block 7a. Web 22 separates compartment 10b from compartment 10a, while web 23 separates compartment 11b from compartment 11a. Web 22 is provided with a passageway 24 that provides communication between compartment 10a and compartment 10b, while web 23 is provided with a passageway 25 that provides communication between compartment 11a and compartment 11b.

With this structure, the steady state pressure in compartment 10a is always equal to that of compartment 10b, while the steady state pressure in compartment 11a is always equal to that of compartment 11b. Furthermore, in a steady state condition, the pressure in compartment 10c is equal to that of compartments 10b and 10a, and the pressure in compartment 11a is equal to that in compartments 11c and 11b, since the compartments on each side of diaphragm 8 are all interconnected.

A meter 26 is shown as comprising a cylindrical shell or housing 27 defining a compartment 28, which is subdivided by an expansible bellows 30 to provide a compartment 29. The difference in pressure between compartment 28 and compartment 29 causes bellows 30 to expand or contract, depending upon the direction of the pressure differential. A rod 31 is connected to and supported by the free end of bellows 30. Rod 31 extends through the upper portion 32 of cylindrical housing 27 and is supported by a packing nut 33. Rod 31 is pivotally connected to a meter needle 34 which pivots about a fulcrum 35. A point 36 on needle 34 indicates on a scale 37 the pressure differential between compartments 29 and 28 in response to the movement of bellows 30.

A conduit 38 connects the high pressure side 5 of conduit 1 to over-pressure device 6. A bore 39 through cylinder block 7a registers with a bore 40 through the skirt of piston 14 to allow the compressible fluid to pass from the high pressure side 5 of conduit 1 to compartment 11c on the bottom of piston 14. A bore 41 in cylinder block 7a connects compartment 11b above piston 14 with conduit 42 that connects the over-pressure device 6 with the housing 27 of meter 26. Conduit 42 conducts the compressible fluid from compartment 11b to compartment 29 within the bellows 30.

In similar fashion, a conduit 43 connects the low pressure side 5a of conduit 1 to over-pressure device 6. A bore 44 conducts the compressible fluid through the cylinder block 7, while a bore 45 registers with bore 44 and conducts the fluid through the skirt of piston 13 into compartment 10b. A bore 46 connects compartment 10c with a conduit 47 that connects over-pressure device 6 with the compartment 28 of meter 26. This conduit 47 allows the compressible fluid from compartment 10c to pass into the meter compartment 28 and act in opposition to the pressure within compartment 29.

A cap 48 threadedly engages the internal threaded end 48a of shell 7 and a plug 49 threadedly engages a threaded recess 49a in the upper end of cap 48. Plug 49 and cap 48 define a valve chamber 50.

A valve 51 is positioned in valve chamber 50 and has a valve stem 52 that passes through cap 48 into compartment 10c. Valve stem 52 is positioned to be actuated by piston 13 to be raised to expose a bore 53 provided in cap 48 that interconnects valve 50 with bore 46. Cap 48 is further provided with an opening 54 that threadedly engages a conduit 55 that interconnects conduit 42 and valve chamber 50.

With this structure, when valve 51 is raised by piston 13, the compressible fluid in conduit 42 can pass through conduit 55 into valve chamber 50, thence past valve 51 into bore 53 to bore 46 and conduit 47 to balance the pressure in conduits 42 and 47.

A spring 56 is interpositioned between plug 49 and valve 52 to maintain it closed over bore 53. Spring 56 is a light spring that serves the sole purpose of keeping the valve closed. A second spring 57 is calibrated and defines the operating differential at which the over-pressure device will function. Spring 57 is positioned between cap 48 and piston 13 to prevent piston 13 from opening valve 52 until the force exerted by spring 57 is offset by pressure on pistons 13 or 14 after an explosion or by diaphragm 8 if a high differential is slowly built up. The pistons 13 or 14 do not actuate the valve when the high differential is slowly built up because of the interconnecting passageways heretofore described.

Since cap 48 is threadedly engaged with shell 7, the spring 57 is readily removable to be interchanged with one having a different spring constant. This structure permits the differential rating of the over-pressure protective device to be changed.

In operation, this new and improved over-pressure device operates and functions as follows. Expansible fluid, such as gas, air, or the like, from the high pressure side 5 of conduit 1 passes through conduit 38 and bores 39 and 40 to compartment 11c to act on the bottom surface of piston 14. The expansible fluid from the low pressure portion 5a of conduit 1 passes through conduit 43 and and bores 44 and 45 to compartment 10b to act on the lower surface of a piston 13. The expansible fluid from compartment 11c passes through bore 21 in ferrule 20 to the upper surface of piston 14 into compartment 11b and through bore 25 to compartment 11a to act on one side of diaphragm 12. The expansible fluid from compartment 10b passes through bore 24 to compartment 10a to act on the other side of diaphragm 12. Under these conditions, the pressure from the low side 5a of conduit 1, plus the pressure of the interchangeable spring 57, acts in one direction on rod 15 and diaphragm 8, while the expansible fluid from the high pressure compartment 5 in conduit 1 acts in the other direction on rod 15 and diaphragm 8. Under normal operating conditions for any selected spring 57, a steady state condition exists and a continuous supply of expansible fluid acts on either side of the bellows 30 in meter 26. The pressure balance between compartments 28 and 29 on either side of the bellows influences the direction of needle 34 and its reading on scale 37.

If an explosion occurs, for example, in the high pressure compartment 5 of conduit 1, then high pressure fluid passes through conduit 38 to the lower surface of piston 14 to force piston 14 and rod 15 up; thus, piston 14 closes over bore 41 and piston 13 closes over bore 46. This shuts off the supply of expansible fluid to meter 26 and, thus, protects it from the high differential pressure that might exist because of the explosion in the high pressure compartment. In addition, as rod 15 and pistons 14 and 13 are moved up, valve stem 52 is actuated to raise valve 51 and interconnect conduits 47 and 55. With the passage of fluid from the high pressure conduits 42 and 55 into valve chamber 50 and through it into conduit 47, the pressure in compartments 28 and 29 of meter 26 is equalized to relieve any strain on bellows 30.

As soon as enough of the compressible fluid passes through orifice 3 in conduit 1 to reduce the high unbalanced pressure between compartments 5 and 5a in conduit 1, the pressure from compartment 5a of conduit 1 acting on one side of diaphragm 8, plus the pressure caused by spring 57, will offset the pressure from the high pressure compartment 5 acting on the opposite side of diaphragm 8, whereupon piston 13 and piston 14 connected by rod 15 will move down to expose bores 44 and 41, respectively. This movement connects meter 26 to conduit 1 and the differential pressure is again recorded. With this structure, it is obvious that the over-pressure protective device is an automatic instrument that responds to any differential pressure beyond the preset differential determined by spring 57. Specifically, if the differential pressure determined by spring 57 is exceeded, the over-pressure protective device automatically disconnects meter 26 from conduit 1; then, when the differential again recedes below the predetermined limit, the over-pressure device automatically reconnects meter 26 to conduit 1.

It is to be noted that whether the high pressure differential is caused by either an explosion or whether the high differential is slowly built up, the over-pressure protective device still functions to shut off the supply of the expansible fluid to the meter. Obviously, the use of such an over-pressure protective device saves much time and effort and expense, since it protects sensitive differential instruments from high unbalanced pressures.

Modifications of this invention will occur to those skilled in the art and it is desired to be understood, therefore, that this invention is not to be limited to the particular embodiment disclosed, but is intended to cover all modifications which are within the spirit and scope of this invention.

What I claim as new and desire to secure by Letters Patent of the United States is:

1. An over-pressure protective device for automatically disconnecting a pressure gauge from a source of differential pressure at a predetermined value of differential pressure comprising a cylinder block having two axially aligned cylinders, a flexible diaphragm separating said cylinders, a separate piston movably mounted in each of said cylinders, a rod rigidly interconnecting said pistons secured to said diaphragm, conduit means connecting corresponding sides of said pistons one to each side of said pressure differential source, conduit means connecting said cylinders to the pressure gauge, said pistons moving in response to a predetermined pressure differential to close said conduit means connecting said cylinders to the gauge.

2. An over-pressure protective device for automatically disconnecting a differential gauge from a differential pressure source at a predetermined value of differential pressure and for automatically re-connecting the differential gauge to the source when the differential pressure decreases to a value less than said predetermined value, comprising a circumferential wall defining an axially extending cylinder to house a first piston and a second piston, each slidable in said cylinder, a rod rigidly interconnecting said pistons, a flexible diaphragm secured to said rod transverse to the axis of said continuous wall to divide said cylinder into two axially juxtapositioned compartments, conduit means for conducting an elastic fluid from the high pressure side of said differential source to one side of said first piston, conduit means for conducting an elastic fluid from the low pressure side of said differtial source to the corresponding side of said second piston, each of said pistons having a steady state position and an actuated position, conduit means positioned in said wall above the steady state position of each of said pistons to connect said over-pressure device to said differential gauge, said pistons being actuated in response to a sudden predetermined pressure differential to close said conduit means positioned above said piston steady state position to prevent rupturing of said differential gauge.

3. An over-pressure protective device for automatically disconnecting a differential gauge from a differential pressure source at a predetermined value of differential pressure and for automatically re-connecting the differential gauge to the source when the differential pressure decreases to a value less than said predetermined value, comprising a hollow cylinder block defining a central cylinder, a first piston and a second piston each slidable in said cylinder and each having an actuated and a steady state position, a rod rigidly interconnecting said pistons, a flexible diaphragm secured to said rod transverse to the axis of said cylinder to separate said cylinder into two axially juxtapositioned compartments, a hollow cap positioned at the end of one of said compartments, a valve including a valve rod positioned in said cap with said valve rod extending therethrough into one of said axial compartments to be actuated by the movement of the first of said pistons, a plug in said cap at the end opposite said valve to define with said cap a valve chamber, a first spring positioned between said valve and said plug to maintain said spring in a closed position, a calibrated spring positioned between the end of said cap and the first of said pistons to surround said valve rod, conduit means for conducting elastic fluid from the high pressure side of said differential source to one side of the second of said pistons, a bore extending through said second piston to connect said first side of said second piston to said diaphragm, conduit means for conducting an elastic fluid from the low pressure side of said differential source to a corresponding side of said first piston and to the other side of said diaphragm, conduit means positioned above the steady state position of each of said pistons to connect said over-pressure devices to said differential gauge, conduit means connecting said conduit positioned above said steady state position of said second piston to said valve housing, said pistons automatically responding to a sudden predetermined pressure differential to close said conduits positioned above said piston steady state positions to isolate said differential gauge from said differential pressure source and to actuate said valve rod to interconnect said conduits connecting said differential gauge to said over-pressure protective device to balance the pressure in said conduits and to relieve any stress on said differential gauge, said diaphragm automatically responding to a slowly built-up predetermined pressure differential to move said pistons to their actuated position to close said conduits positioned above said piston steady state position to isolate said differential gauge from said differential pressure source, said pistons automatically returning to their steady state position when said differential pressure recedes below said predetermined level to automatically re-connect said differential gauge to said differential pressure source.

ARTHUR P. BENTLEY.

REFERENCES CITED

The following references are of record in the file of this patent:

UNITED STATES PATENTS

| Number    | Name        | Date          |
|-----------|-------------|---------------|
| 2,345,464 | De Giers    | Mar. 28, 1944 |
| 2,374,523 | Beecher     | Apr. 24, 1945 |
| 2,402,171 | Lutes et al.| June 18, 1946 |
| 2,470,288 | Childs      | May 17, 1949  |